(12) United States Patent
Sato (10) Patent No.: US 10,088,622 B2
(45) Date of Patent: Oct. 2, 2018

(54) LIGHT GUIDING LENS AND LIGHTING UNIT

(71) Applicant: Stanley Electric Co., Ltd., Tokyo (JP)

(72) Inventor: Koji Sato, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 127 days.

(21) Appl. No.: 15/204,658

(22) Filed: Jul. 7, 2016

(65) Prior Publication Data

US 2017/0010403 A1    Jan. 12, 2017

(30) Foreign Application Priority Data

Jul. 10, 2015 (JP) ................. 2015-138385

(51) Int. Cl.
| | |
|---|---|
| F21V 7/04 | (2006.01) |
| F21V 8/00 | (2006.01) |
| G02B 19/00 | (2006.01) |
| F21S 43/14 | (2018.01) |
| F21S 43/239 | (2018.01) |

(Continued)

(52) U.S. Cl.
CPC ............ *G02B 6/0045* (2013.01); *F21S 43/14* (2018.01); *F21S 43/239* (2018.01); *F21S 43/241* (2018.01); *F21S 43/243* (2018.01); *F21S 43/249* (2018.01); *G02B 6/0018* (2013.01);

(Continued)

(58) Field of Classification Search
CPC .. G02B 6/0018; G02B 6/0028; G02B 6/0033; G02B 6/0035; G02B 6/0036; G02B 6/0038; G02B 6/0045; G02B 19/0047; G02B 19/0061; G02B 19/0066; G02B 19/0028; F21S 48/215; F21S 48/225; F21S 48/2243; F21S 48/2262; F21S 48/2281

See application file for complete search history.

(56) References Cited

U.S. PATENT DOCUMENTS

| | | | | |
|---|---|---|---|---|
| 8,506,129 | B2 * | 8/2013 | Okada | .................... F21S 48/115 |
| | | | | 362/296.01 |
| 9,574,731 | B2 * | 2/2017 | Giraud | .................... F21S 48/00 |

(Continued)

FOREIGN PATENT DOCUMENTS

| | | |
|---|---|---|
| EP | 2 479 486 A2 | 7/2012 |
| EP | 3 115 685 A1 | 1/2017 |
| JP | 2010-3597 A | 1/2010 |

*Primary Examiner* — Thien M Le
*Assistant Examiner* — April Taylor
(74) *Attorney, Agent, or Firm* — Kenealy Vaidya LLP (57) ABSTRACT

An elongated light guiding lens can include an incident portion and a light guiding portion with an L-shaped cross section. The incident portion can be erected at a rear end portion of the light guiding portion, and have a second incident surface at its left end, for receiving light from an LED while collimating the light in the vertical direction. The light guiding portion can extend forward while expanding leftward more than the position corresponding to the second incident surface, and include a second reflection surface provided below the second incident surface to internally reflect the light from the second incident surface toward a side reflection surface of a left end side surface. The side reflection surface can include a plurality of first lens cuts configured to internally reflect the light reflected by the second reflection surface to a light exiting surface of the front surface portion.

6 Claims, 6 Drawing Sheets

(51) Int. Cl.
*F21S 43/241* (2018.01)
*F21S 43/243* (2018.01)
*F21S 43/249* (2018.01)

(52) U.S. Cl.
CPC ......... *G02B 6/0036* (2013.01); *G02B 6/0038* (2013.01); *G02B 19/0028* (2013.01); *G02B 19/0066* (2013.01)

(56) References Cited

U.S. PATENT DOCUMENTS

9,625,636 B2 * 4/2017 Durkee ................ G02B 6/0021
2009/0237910 A1 9/2009 Takada et al.

* cited by examiner

LIGHT GUIDING LENS AND LIGHTING UNIT

This application claims the priority benefit under 35 U.S.C. § 119 of Japanese Patent Application No. 2015-138385 filed on Jul. 10, 2015, which is hereby incorporated in its entirety by reference.

TECHNICAL FIELD

The presently disclosed subject matter relates to a light guiding lens and a lighting unit including the light guiding lens

BACKGROUND ART

Figure 1A:
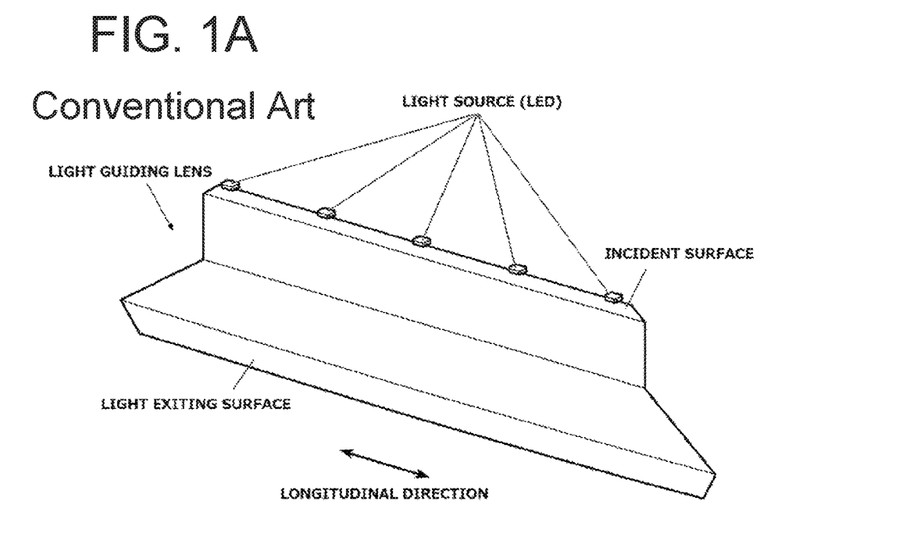
FIGS. 1A and 1B are drawings illustrating a conventional lighting unit.
Figure 1B:
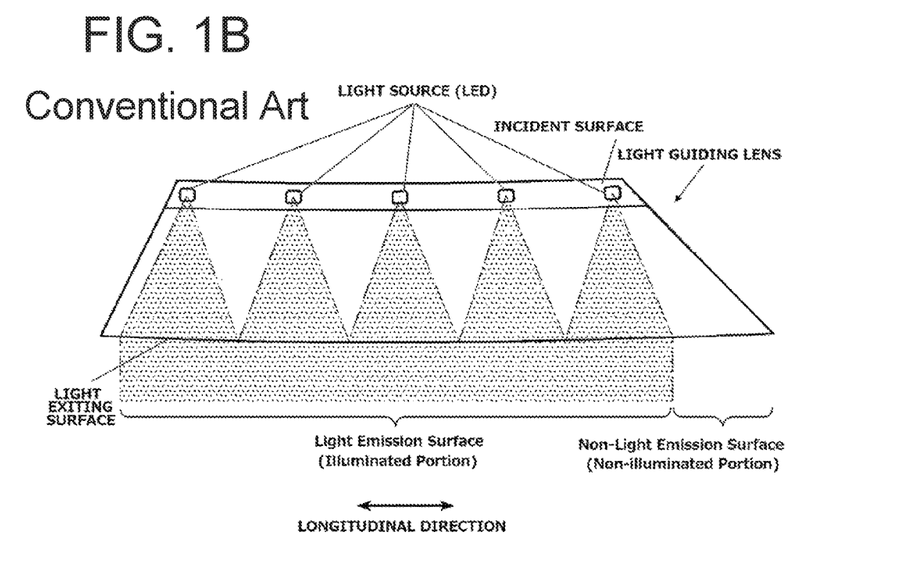

One type of conventional various vehicle lighting units may be one that includes a bent light guiding lens having an L-letter shape bent at a bent portion, and the light guiding lens is illuminated with light to emit light therethrough (for example, Japanese Patent Application Laid-Open No. 2010-003597), as illustrated in FIGS. 1A and 1B.

Specifically, this type of lighting unit, as illustrated in FIG. 1A, can include an elongated light guiding lens having an L-letter shaped cross section. The light guiding lens can have an incident surface at one end of the L-letter shape and a light-exiting surface at the other end thereof. Further included are a plurality of light sources such as light emitting diodes disposed to face to the incident surface. Light emitted from each of the light sources can enter the light guiding lens through the incident surface, and can be totally reflected by the bent portion of the L-letter shape to exit through the light-exiting surface. At that time, the plurality of light sources can be disposed at appropriate intervals therebetween such that the light diffusion ranges of the adjacent light sources can be overlapped with each other in the longitudinal direction, so that the elongated light-exiting surface can be illuminated with uniform light or light can be emitted through the light-exiting surface in a line-shaped manner.

In the aforementioned conventional lighting unit, the light entering the light guiding lens through the incident surface is simply reflected at the bent portion to exit through the light-exiting surface. Thus, the light diffusion ranges from the respective light sources in the longitudinal direction are limited to a certain extent.

As illustrated in FIG. 1B, suppose a case where there is a portion of the light guiding lens that is extendedly formed outside of the light diffusion ranges, specifically, the light guiding lens may have a largely extended end portion of the light-exiting surface relative to the end portion of the incident surface. In this case, the light cannot be properly guided to the extended end portion of the light-exiting surface due to the limited light diffusion ranges, meaning that the extended end portion of the light guiding lens cannot be illuminated with light. As a result, when the lighting unit is installed within a housing (light chamber), it would be difficult to project light with the entire elongated light-exiting surface, which makes the degree of design freedom and marchantability decreased.

SUMMARY

The presently disclosed subject matter was devised in view of these and other problems and features in association with the conventional art. According to an aspect of the presently disclosed subject matter, a light guiding lens can have an end portion in its longitudinal direction that can be appropriately and properly illuminated with light (light can properly exit therethrough). Furthermore, there can be provided a lighting unit having such a light guiding lens.

According to another aspect of the presently disclosed subject matter, a light guiding lens can project light in a light-irradiating direction as a forward direction and can include: an incident portion that can receive light emitted from a light source so that the light can enter the light guiding lens; and a light guiding portion that can have a rear end portion and a front surface portion and guide the light entering through the incident portion to cause the light to exit through the front surface portion. The light guiding lens can be extended from the rear end portion to the front surface portion in the light-irradiation direction and also in a second direction as a longitudinal direction crossing the light-irradiation direction as a front-rear direction. Here, the incident portion can be provided at the rear end portion of the light guiding portion to be erected therefrom. The incident portion can have an incident surface that can be disposed at one longitudinal end portion of the incident portion on one end side and configured to receive light from the light source to cause the light to enter the incident portion and to be in parallel to a direction in which the incident portion is erected. The light guiding portion can have a longitudinal end portion projected more than the one longitudinal end portion of the incident portion in the second direction (longitudinal direction) and having a side end surface while the light guiding portion is gradually widened from the rear end portion to the front surface portion including the longitudinal end portion. The light guiding portion can have a reflection surface at the rear end portion to be opposite to the incident surface, and the reflection surface can be configured to internally reflect light entering through the incident surface and guided through the incident portion to the side end surface of the longitudinal end portion. The side end surface can have a plurality of lens cuts formed therein, so that the lens cuts can internally reflect the light having been internally reflected by the reflection surface to the front surface portion.

In the light guiding lens with the above-described configuration, the side end surface can be formed to have a front side end surface projected sharply in the second direction (longitudinal direction) more than the remaining side end surface. Furthermore, the front surface portion of the light guiding portion can have a side end front surface positioned in front of the front side end surface of the side end surface, and the side end front surface can include a plurality of second lens cuts configured to forwardly refract the light having been internally reflected by the reflection surface.

In the light guiding lens with any of the above-described configurations, the incident portion can include a second incident surface extending in the second direction (longitudinal direction) on the other end side, the second incident surface being configured to receive light emitted from another light source so that the light can enter the incident portion. The light guiding portion can include a second reflection surface at the rear end portion to be opposed to the second incident surface and to be opposed to the front surface portion, and the second reflection surface can be configured to internally reflect the light entering through the second incident surface and guided through the incident portion to the front surface portion.

According to still another aspect of the presently disclosed subject matter, a lighting unit can include the light source(s) and the light guiding lens with any of the above-mentioned configurations.

According to the presently disclosed subject matter, the light emitted from the light source can enter the light guiding lens through the incident surface of the incident portion provided at the one longitudinal end portion thereof while being collimated in the direction in which the incident portion is erected. Then, the light can be internally reflected by the opposite reflection surface provided to the rear end surface of the light guiding portion toward the side end surface on one end side of the light guiding portion. Then, the light can be internally reflected by the plurality of lens cuts formed in the side end surface of the light guiding portion to be projected forward through the front surface portion of the light guiding portion.

With this configuration, even when the light guiding lens has a largely projected longitudinal end portion of the light guiding portion more than the one end portion of the light incident portion, the longitudinal end portion of the front surface portion of the light guiding portion can be illuminated with light properly.

According to the configuration of the presently disclosed subject matter, the front side end surface of the side end surface of the light guiding portion can be formed to be projected sharply in the second direction (longitudinal direction) more than the remaining side end surface. Furthermore, the front surface portion of the light guiding portion can have the side end front surface positioned in front of the front side end surface of the side end surface. Furthermore, the side end front surface can include the plurality of second lens cuts configured to forwardly refract the light having been internally reflected by the reflection surface.

With this configuration, the light out of the light internally reflected by the reflection surface of the light guiding portion, the light being directed to the front side end surface of the side end surface, can be guided to the longitudinal one end side, and then refracted by the plurality of second lens cuts to exit through the front surface portion of the light guiding portion.

Thus, the entire front surface portion of the light guiding portion including the longitudinal end front surface can be uniformly illuminated with light.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to a light guiding lens and a lighting unit of the presently disclosed subject matter with reference to the accompanying drawings in accordance with exemplary embodiments.

Figure 2:
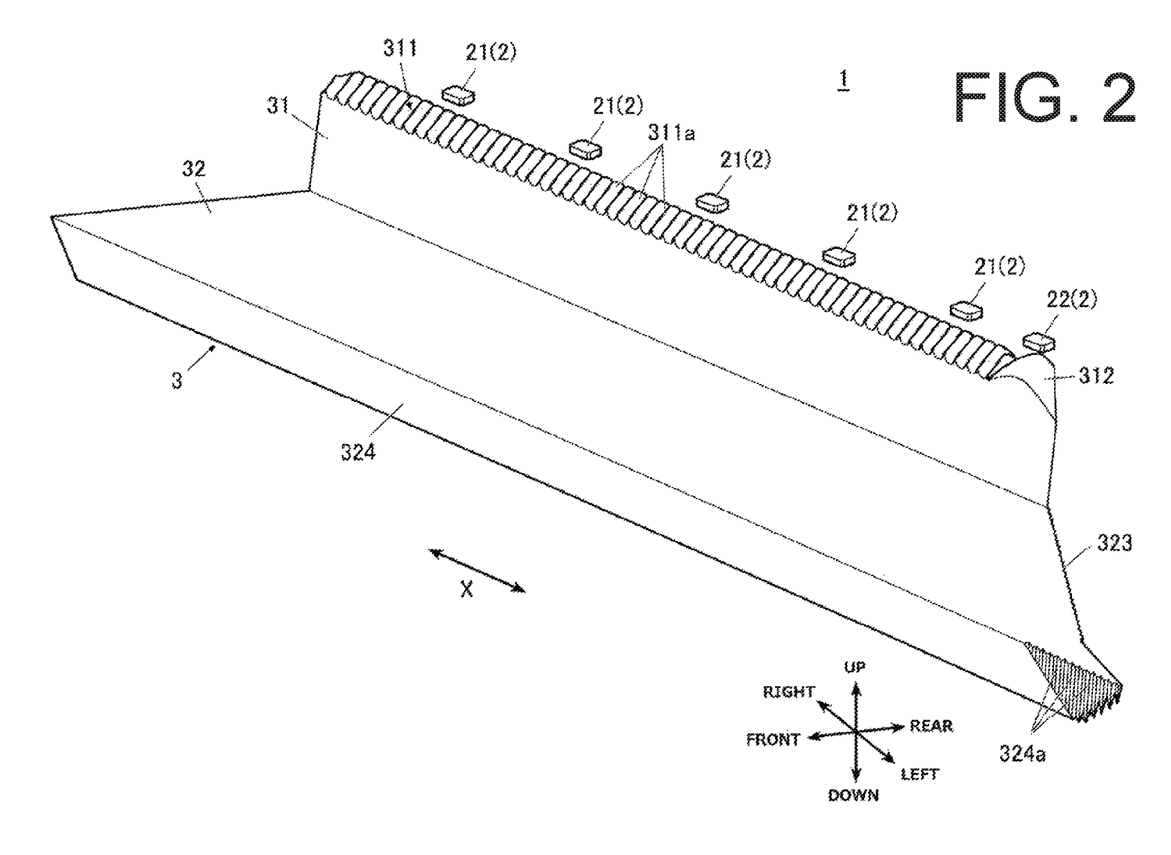
FIG. 2 is a perspective view of a lighting unit of an exemplary embodiment made in accordance with principles of the presently disclosed subject matter.
Figure 3:
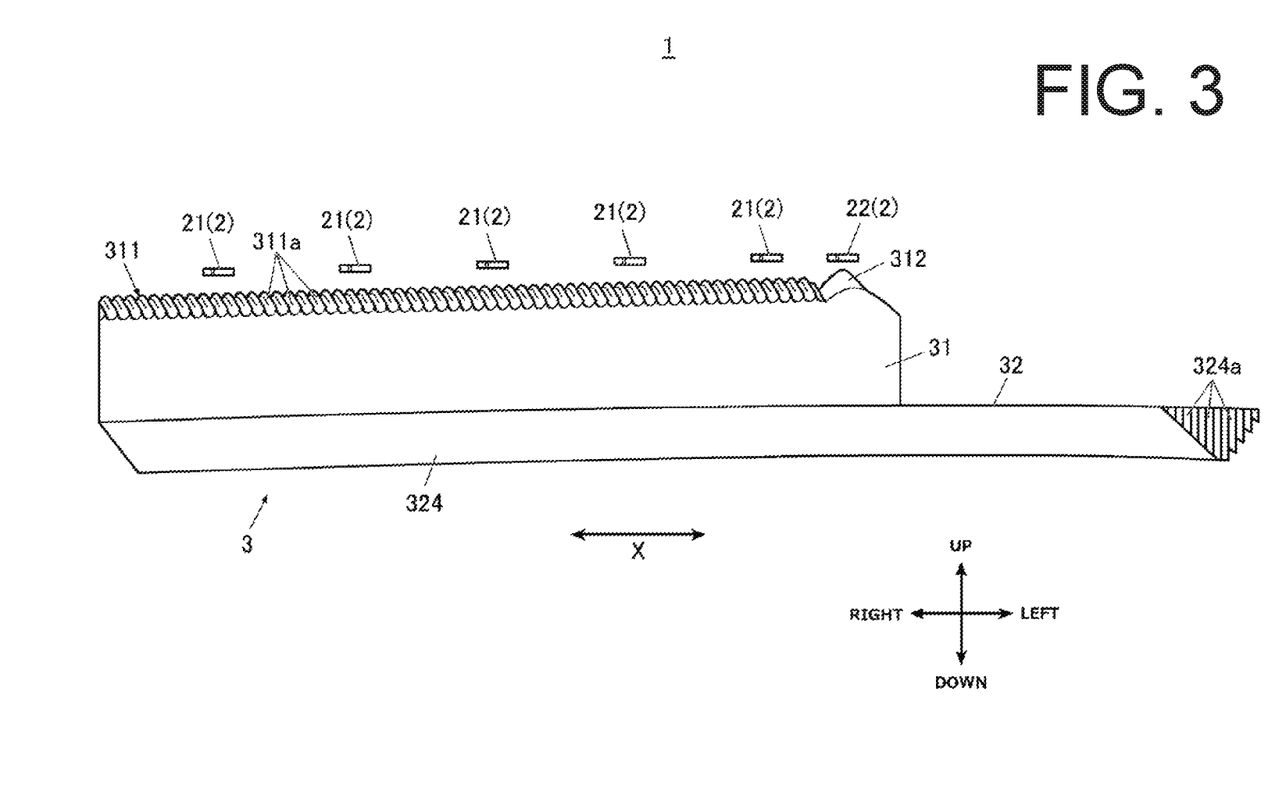
FIG. 3 is a front view of the lighting unit of the exemplary embodiment.
Figure 4:
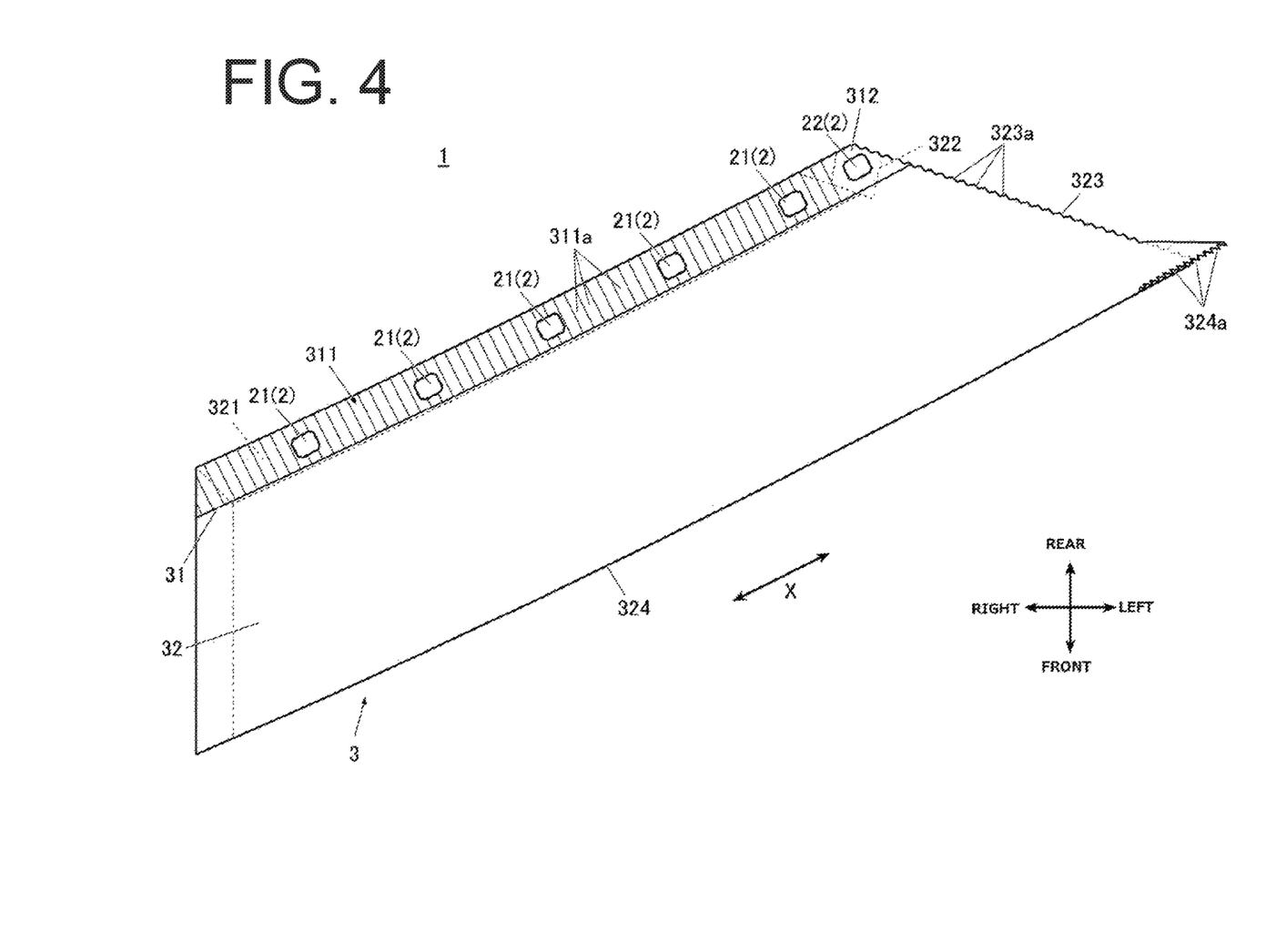
FIG. 4 is a plan view of the lighting unit of the exemplary embodiment.
Figure 5:
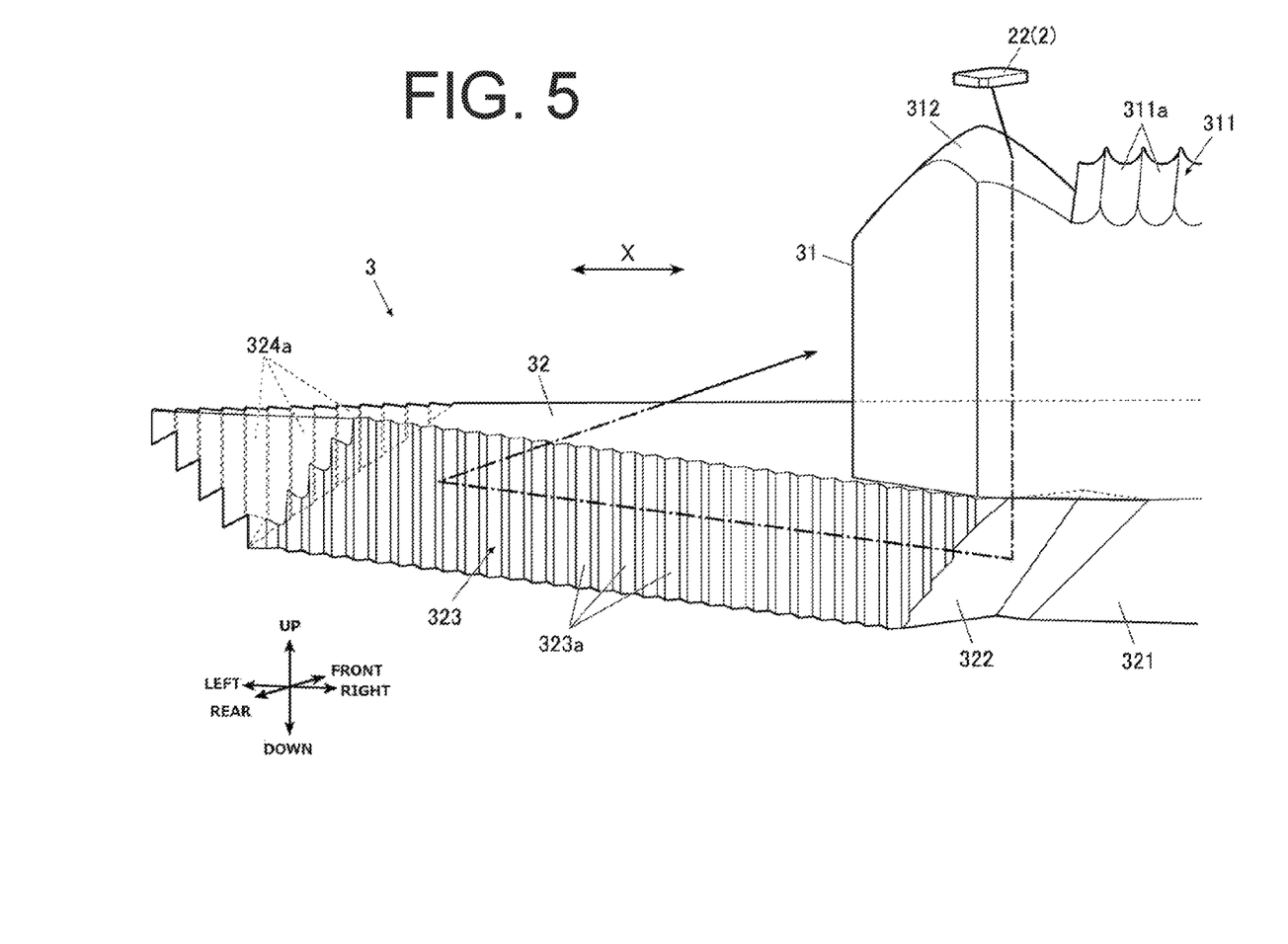
FIG. 5 is a perspective view of the lighting unit of the exemplary embodiment when its left end portion is observed from its obliquely rear side.

FIGS. 2 to 4 are a perspective view, a front view, and a plan view of a lighting unit 1 made in accordance with the principles of the presently disclosed subject matter. Furthermore, FIG. 5 is a perspective view of the lighting unit of the exemplary embodiment when its left end portion is observed from its obliquely rear side.

The lighting unit 1 of the present exemplary embodiment can be a vehicle lighting unit to be installed in a not-illustrated vehicle body. As illustrated in FIGS. 2 to 4, the lighting unit 1 can include a plurality of light emitting diodes (LEDs) 2 as light sources, and a light guiding lens 3 to be illuminated with the light from the LEDs 2 (or the light can be projected through the light guiding lens 3).

As illustrated, the directions of "front," "rear (back)," "left," "right," "up (high)," and "down (low)" mean to indicate the directions when the lighting unit 1 is installed in the not-illustrated vehicle body and can project light forward of the vehicle body, unless otherwise specified.

The light guiding lens 3 can be formed to have an elongated bent plate with an L-letter shaped cross section. The light guiding lens 3 can extend in a direction X that corresponds to a longitudinal direction. In an actual case, the light guiding lens 3 can be positioned and extended substantially in the direction X that is inclined obliquely rearward and leftward with respect to the left-right direction of the not-illustrated vehicle body.

Specifically, the light guiding lens 3 can be configured to include an incident portion 31 and a light guiding portion 32. The incident portion 31 can receive the light from the plurality of LEDs 2 to allow the light to enter the light guiding lens 3. The light guiding portion 32 can guide the light from the incident portion 31 so that the light can be projected therethrough forward.

The incident portion 31 can be formed as an elongated rectangular plate shape extending in the longitudinal direction X and erected upward from the rear end portion of the light guiding portion 32. The incident portion 31 can include an incident surface at its upper end surface. The incident surface can be configured to face to the plurality of LEDs 2 so as to receive light from the plurality of LEDs 2.

The incident surface at the upper end surface of the incident portion 31 can include a first incident surface 311 being almost the entire surface excluding its left end portion. The first incident surface 311 can be formed to have a reference surface and a plurality of lens cuts 311a formed in the reference surface. Specifically, the reference surface can have a cross section orthogonal to the longitudinal direction X and the cross section can be formed to be convex upward with an apex at the center position in the thickness direction of the incident portion 31. The plurality of lens cuts 311a can be formed in the entire reference surface of the first incident surface 311 and arranged side by side in the longitudinal direction X. The plurality of lens cuts 311a can be continuously formed with a U-letter shaped recess, as illustrated in FIG. 5. The plurality of lens cuts 311a can be used to absorb the positional displacement of first LEDs 21, to be described later, in the longitudinal direction X.

The plurality of LEDs 2 can include the first LEDs 21 (in the illustrated embodiment, five LEDs 21) and a second LED 22 to be disposed at the left end portion, which will be described later. The first LEDs 21 can be arranged at equal intervals in the longitudinal direction X above the first incident surface 311 so that their light emission surfaces face to the first incident surface 311 substantially at the center position in the thickness direction of the incident portion 31.

Thus, the first incident surface 311 with this configuration can receive the light (diffused light) emitted downward from the plurality of first LEDs 21 so as to collimate the light substantially along the vertical direction within the plane orthogonal to the longitudinal direction X while diffusing the light in the longitudinal direction X at the same time within the incident portion 31.

The incident surface at the upper end surface of the incident portion 31 can further include a second incident surface 312 at its left end portion. The second incident surface 312 can be formed to project upward to form an aspheric projected surface having a focal point with an apex at its center in a plan view. The second LED 22 out of the plurality of LEDs 2 can be disposed above the second incident surface 312 to face to the second incident surface 312 and be positioned at or near the focal point of the second incident surface 312.

Thus, the second incident surface 312 with this configuration can receive the light (diffused light) emitted downward from the second LED 22 so as to collimate the light substantially along the vertical direction within the incident portion 31.

The light guiding portion 32 can be formed to extend from its rear end portion to its front surface portion and also in the longitudinal direction X so as to expand forward with increased width in a plan view.

The light guiding portion 32 can include a reflection surface at its rear end surface just below the incident portion 31 so as to reflect light guided through the incident portion 31.

Specifically, the rear end surface of the light guiding portion 32 can include a first reflection surface 321 being almost the entire surface excluding its left end portion. The first reflection surface 321 can be positioned below (or correspond to) the first incident surface 311 of the incident portion 31 and formed to be an inclined plane of which cross section perpendicular to the longitudinal direction X is inclined by an angle of about 45 degrees forward and downward.

Thus, the first reflection surface 321 with this configuration can internally reflect (totally reflect) the light entering through the first incident surface 311 and guided through the incident portion 31 forward to the front surface portion of the light guiding portion 32.

The rear end surface of the light guiding portion 32 can further include a second reflection surface 322 at its left end portion. As illustrated in FIGS. 2 and 5, the second reflection surface 322 can be positioned just below the second incident surface 312 of the incident portion 31 in a plan view. Furthermore, the second reflection surface 322 can be directed obliquely leftward and forward so as to cross a left end surface of the light guiding portion 32 (a side reflection surface 323 to be described later) at an acute angle slightly smaller than 90 degrees. Thus, when the second reflection surface 322 is observed in a side view, the second reflection surface 322 can be formed in a plane shape inclined forward and downward at an angle of about 45 degrees.

Thus, the second reflection surface 322 with this configuration can receive and internally reflect (totally reflect) the light, which has entered through the second incident surface 312 and been guided downward, to the entire left end surface of the light guiding portion 32 in an obliquely leftward and forward direction.

The light guiding portion 32 can be formed to gradually expand leftward from the rear end portion to the front surface portion in the longitudinal direction X so that the left end portion of the light guiding portion 32 projects leftward more than the left end portion of the incident portion 31 in a plan view. More specifically, the left end portion of the light guiding portion 32 can project leftward in two steps, including a straight projecting portion from the rear end portion to a position near the front end, a bent portion, and a front projection portion extending from the bent portion to the front surface portion. The front projection portion can project sharply leftward as illustrated in FIG. 4.

The straight projecting portion of the left end portion (left end surface) can have a plurality of first lens cuts 323a in a planar reference surface along the vertical direction, so as to form a side reflection surface 323. The plurality of first lens cuts 323a can each be formed in a triangular prism shape and arranged side by side in the longitudinal direction along the entire surface of the side reflection surface 323.

The side reflection surface 323 with this configuration can receive the light internally reflected by the second reflection surface 322 and internally reflect (totally reflect) the same by means of the plurality of first lens cuts 323a forward.

The light guiding portion 32 can have the front surface portion serving as a light exiting surface 324 through which the light guided within the light guiding portion 32 can exit and be projected forward.

The light exiting surface 324 can include a plurality of second lens cuts 324a at its left end portion arranged side by side in the longitudinal direction (left-right direction). Specifically, the plurality of second lens cuts 324a can be formed in a portion of the light exiting surface 324 at a position located on the left side of the side reflection surface 323 where the plurality of first lens cuts 323a are formed, namely, in front of the left end surface of the front projection portion of the light guiding portion 32.

The plurality of second lens cuts 324a with this configuration can receive the light internally reflected by the second reflection surface 322 and guided more forward than the side reflection surface 324 and refract the same forward to project the light from the light guiding portion 32.

Figure 6A:
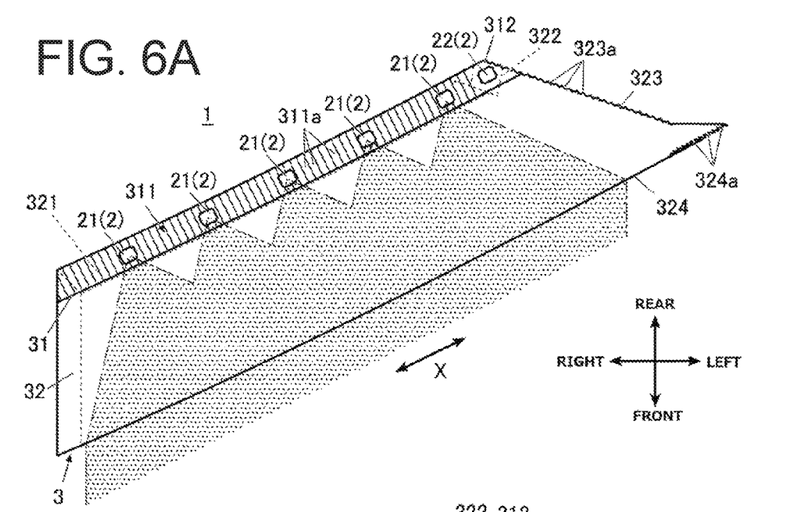
FIGS. 6A and 6B are diagrams illustrating how the lighting unit of the exemplary embodiment can guide and project light.

Therefore, in the lighting unit 1 with this configuration, as illustrated in FIG. 6A, the light emitted from the plurality of first LEDs 21 out of the plurality of LEDs 2 can be incident on the first incident surface 311 of the incident portion 31 to enter the incident portion 31 through the first incident surface 311, and be internally reflected by the first reflection surface 321 of the light guiding portion 32 (which is positioned just below the first incident surface 311) forward to be projected through the light exiting surface 324 of the front surface portion of the light guiding portion 32.

In this manner, the light emitted from the respective first LEDs 21 can be diffused in the longitudinal direction X in a predetermined range to be overlapped with light emitted from an adjacent first LED 21 and projected through the light exiting surface 324. As a result, the light exiting surface 324 except for the left end portion can be illuminated with light.

It should be noted that FIG. 6A is a diagram schematically illustrating the light emission range from the plurality of first LEDs 21, but does not show an accurate optical path from each of the first LEDs 21.

On the other hand, as illustrated in FIG. 5, the light emitted from the second LED 22 at the left end position of the plurality of LEDs 2 can be incident on the second incident surface 312 of the incident portion 31 to enter the incident portion 31 while being collimated along the vertical direction, and be internally reflected by the second reflection surface 322 of the light guiding portion 32 (which is positioned just below the second incident surface 312)

obliquely leftward and forward to the entire left end surface of the light guiding portion 32.

Figure 6B:
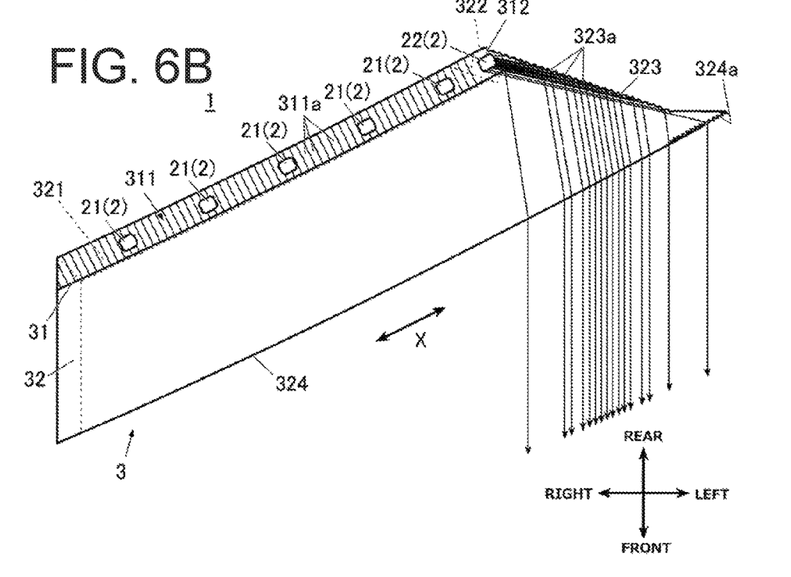

As illustrated in FIG. 6B, almost all the light having been incident on the side reflection surface 323 can be internally reflected by the plurality of lens cuts 323a formed in the side reflection surface 323 to the front surface portion to be projected through the light exiting surface 324 of the front surface portion of the light guiding portion 32.

Further, a portion of the light having reached the front projection portion more forward than the extension line of the side reflection surface 323 can be incident on the plurality of second lens cuts 324a formed at the left end portion of the light exiting surface 324, thereby being refracted by the same to be projected through the light exiting surface 324 forward.

In this manner, the left end portion of the light exiting surface 324 of the light guiding lens 3, which has not been able to receive the light from the plurality of first LEDs in the conventional lighting unit, can be illuminated with light, meaning that the entire elongated light exiting surface 324 extending in the longitudinal direction X can be illuminated with light (the light can be projected through the almost entire light exiting surface 324).

According to the lighting unit 1 of the presently disclosed subject matter, the light emitted from the second LED 22 can enter the light guiding lens 3 through the second incident surface 312 of the incident portion 31 provided at the left end in the longitudinal direction X while being collimated in the vertical direction. Then, the light can be internally reflected by the opposite second reflection surface 322 provided to the rear end surface of the light guiding portion 32 toward the side end surface, or the side reflection surface 323 on the left end side of the light guiding portion 32. Then, the light can be internally reflected by the plurality of first lens cuts 323a formed in the side reflection surface 323 of the light guiding portion 32 to be projected forward through the front surface portion, or the light exiting surface 324 of the light guiding portion 32.

With this configuration, even when the light guiding lens 3 can have a largely projected left end portion of the light guiding portion 32 more than the left end portion of the light incident portion 31, the left end portion of the front surface portion (light exiting surface 324) of the light guiding portion 32 can be illuminated with light properly.

The front end portion of the left end surface of the light guiding portion 32 can be formed to be projected sharply in the longitudinal direction X more than the remaining left end surface (side reflection surface 323). Furthermore, the light exiting surface 324 of the light guiding portion 32 can have the left end front surface positioned in front of the front end portion of the left end surface. Furthermore, the left end front surface can include the plurality of second lens cuts 324a configured to forwardly refract the light having been internally reflected by the second reflection surface 322.

With this configuration, the light out of the light internally reflected by the second reflection surface 322 of the light guiding portion 32, the light being directed forward than the side reflection surface 323, can be guided to the left end side in the longitudinal direction X, and then refracted by the plurality of second lens cuts 324a to exit through the light exiting surface 324 of the light guiding portion 32.

Thus, the light exiting surface 324 of the light guiding portion 32 including the left end front surface can be uniformly illuminated with light.

Exemplary embodiments to which the presently disclosed subject matter can be applied are not limited to the illustrated exemplary embodiment described above, and can be appropriately modified without departing from the scope of the presently disclosed subject matter.

For example, the incident portion 31 may be provided downward from the rear end portion of the light guiding portion 32 (the illustrated structure can be turned upside down).

Furthermore, the direction in which the light guiding lens 3 extends may be any direction as long as it cross the front-rear direction.

The light guiding lens 3 and the lighting unit 1 using the light guiding lens 3 can be applied to various lighting units in addition to vehicle lighting units as in the illustrated embodiment.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A light guiding lens configured to project light in a light-irradiating direction, the light guiding lens comprising:
   an incident portion configured to receive light emitted from a light source so that the light can enter the light guiding lens; and
   a light guiding portion having a rear end portion and a front surface portion, the light guiding portion being configured to guide the light entering through the incident portion to cause the light to exit through the front surface portion, the light guiding lens being extended from the rear end portion to the front surface portion in the light-irradiation direction and also in a second direction crossing the light-irradiation direction, wherein
   the incident portion is provided at the rear end portion of the light guiding portion to be erected therefrom,
   the incident portion includes an incident surface that is disposed at one longitudinal end portion of the incident portion on one end side and configured to receive light from the light source to cause the light to enter the incident portion and to be in parallel to a direction in which the incident portion is erected,
   the light guiding portion includes a longitudinal end portion projected more than the one longitudinal end portion of the incident portion in the second direction and having a side end surface with the light guiding portion being gradually widened from the rear end portion to the front surface portion including the longitudinal end portion,
   the light guiding portion further includes a reflection surface at the rear end portion to be opposite to the incident surface, the reflection surface being configured to internally reflect light entering through the incident surface and guided through the incident portion to the side end surface of the longitudinal end portion,
   the side end surface includes a plurality of lens cuts formed therein, so that the lens cuts internally reflect the light having been internally reflected by the reflection surface to the front surface portion,
   the side end surface is formed to have a front side end surface projected sharply in the second direction more than the remaining side end surface, and the front surface portion of the light guiding portion includes a side end front surface positioned in front of the front side end surface of the side end surface, and the side end front surface includes a plurality of second lens cuts configured to forwardly refract the light having been internally reflected by the reflection surface.

2. The light guiding lens according to claim 1, wherein the incident portion includes a second incident surface extending in the second direction on the other end side, the second incident surface being configured to receive light emitted from another light source so that the light enters the incident portion, the light guiding portion includes a second reflection surface at the rear end portion to be opposed to the second incident surface and to be opposed to the front surface portion, and the second reflection surface is configured to internally reflect the light entering through the second incident surface and guided through the incident portion to the front surface portion.

3. A light guiding lens configured to project light in a light-irradiating direction, the light guiding lens comprising:

an incident portion configured to receive light emitted from a light source so that the light can enter the light guiding lens; and a light guiding portion having a rear end portion and a front surface portion, the light guiding portion being configured to guide the light entering through the incident portion to cause the light to exit through the front surface portion, the light guiding lens being extended from the rear end portion to the front surface portion in the light-irradiation direction and also in a second direction crossing the light-irradiation direction, wherein the incident portion is provided at the rear end portion of the light guiding portion to be erected therefrom, the incident portion includes an incident surface that is disposed at one longitudinal end portion of the incident portion on one end side and configured to receive light from the light source to cause the light to enter the incident portion and to be in parallel to a direction in which the incident portion is erected, the light guiding portion includes a longitudinal end portion projected more than the one longitudinal end portion of the incident portion in the second direction and having a side end surface with the light guiding portion being gradually widened from the rear end portion to the front surface portion including the longitudinal end portion, the light guiding portion further includes a reflection surface at the rear end portion to be opposite to the incident surface, the reflection surface being configured to internally reflect light entering through the incident surface and guided through the incident portion to the side end surface of the longitudinal end portion, the side end surface includes a plurality of lens cuts formed therein, so that the lens cuts internally reflect the light having been internally reflected by the reflection surface to the front surface portion, the incident portion includes a second incident surface extending in the second direction on the other end side, the second incident surface being configured to receive light emitted from another light source so that the light enters the incident portion, the light guiding portion includes a second reflection surface at the rear end portion to be opposed to the second incident surface and to be opposed to the front surface portion, and the second reflection surface is configured to internally reflect the light entering through the second incident surface and guided through the incident portion to the front surface portion.

4. A lighting unit comprising:

a light source; and a light guiding lens configured to project light from the light source in a light-irradiating direction, the light guiding lens comprising:

an incident portion configured to receive light emitted from the light source so that the light can enter the light guiding lens; and a light guiding portion having a rear end portion and a front surface portion, the light guiding portion being configured to guide the light entering through the incident portion to cause the light to exit through the front surface portion, the light guiding lens being extended from the rear end portion to the front surface portion in the light-irradiation direction and also in a second direction crossing the light-irradiation direction, wherein the incident portion is provided at the rear end portion of the light guiding portion to be erected therefrom, the incident portion includes an incident surface that is disposed at one longitudinal end portion of the incident portion on one end side and configured to receive light from the light source to cause the light to enter the incident portion and to be in parallel to a direction in which the incident portion is erected, the light guiding portion includes a longitudinal end portion projected more than the one longitudinal end portion of the incident portion in the second direction and having a side end surface with the light guiding portion being gradually widened from the rear end portion to the front surface portion including the longitudinal end portion, the light guiding portion further includes a reflection surface at the rear end portion to be opposite to the incident surface, the reflection surface being configured to internally reflect light entering through the incident surface and guided through the incident portion to the side end surface of the longitudinal end portion, the side end surface includes a plurality of lens cuts formed therein, so that the lens cuts internally reflect the light having been internally reflected by the reflection surface to the front surface portion, the side end surface is formed to have a front side end surface projected sharply in the second direction more than the remaining side end surface, and the front surface portion of the light guiding portion includes a side end front surface positioned in front of the front side end surface of the side end surface, and the side end front surface includes a plurality of second lens cuts configured to forwardly refract the light having been internally reflected by the reflection surface.

5. The lighting unit according to claim 4, wherein the incident portion includes a second incident surface extending in the second direction on the other end side, the second incident surface being configured to receive light emitted from another light source so that the light enters the incident portion, the light guiding portion includes a second reflection surface at the rear end portion to be opposed to the second incident surface and to be opposed to the front surface portion, and the second reflection surface is configured to internally reflect the light entering through the second incident surface and guided through the incident portion to the front surface portion.

6. A lighting unit comprising:

a light source; and a light guiding lens configured to project light from the light source in a light-irradiating direction, the light guiding lens comprising:

an incident portion configured to receive light emitted from the light source so that the light can enter the light guiding lens; and a light guiding portion having a rear end portion and a front surface portion, the light guiding portion being configured to guide the light entering through the incident portion to cause the light to exit through the front surface portion, the light guiding lens being extended from the rear end portion to the front surface portion in the light-irradiation direction and also in a second direction crossing the light-irradiation direction, wherein the incident portion is provided at the rear end portion of the light guiding portion to be erected therefrom, the incident portion includes an incident surface that is disposed at one longitudinal end portion of the incident portion on one end side and configured to receive light from the light source to cause the light to enter the incident portion and to be in parallel to a direction in which the incident portion is erected, the light guiding portion includes a longitudinal end portion projected more than the one longitudinal end portion of the incident portion in the second direction and having a side end surface with the light guiding portion being gradually widened from the rear end portion to the front surface portion including the longitudinal end portion, the light guiding portion further includes a reflection surface at the rear end portion to be opposite to the incident surface, the reflection surface being configured to internally reflect light entering through the incident surface and guided through the incident portion to the side end surface of the longitudinal end portion, the side end surface includes a plurality of lens cuts formed therein, so that the lens cuts internally reflect the light having been internally reflected by the reflection surface to the front surface portion the incident portion includes a second incident surface extending in the second direction on the other end side, the second incident surface being configured to receive light emitted from another light source so that the light enters the incident portion, the light guiding portion includes a second reflection surface at the rear end portion to be opposed to the second incident surface and to be opposed to the front surface portion, and the second reflection surface is configured to internally reflect the light entering through the second incident surface and guided through the incident portion to the front surface portion.

\* \* \* \* \*